United States Patent
Williams et al.

(10) Patent No.: US 11,477,006 B2
(45) Date of Patent: *Oct. 18, 2022

(54) SECURE ANALYTICS USING AN ENCRYPTED ANALYTICS MATRIX

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/995,688

(22) Filed: Aug. 17, 2020

(65) Prior Publication Data

US 2020/0382274 A1 Dec. 3, 2020

Related U.S. Application Data

(63) Continuation of application No. 15/876,036, filed on Jan. 19, 2018, now Pat. No. 10,771,237.
(Continued)

(51) Int. Cl.
*H04L 9/00* (2022.01)
*H04L 9/06* (2006.01)
(Continued)

(52) U.S. Cl.
CPC .......... *H04L 9/008* (2013.01); *G06F 16/254* (2019.01); *G06F 16/3344* (2019.01);
(Continued)

(58) Field of Classification Search
None
See application file for complete search history.

(56) References Cited

U.S. PATENT DOCUMENTS

| 5,732,390 A | 3/1998 | Katayanagi et al. |
| 6,178,435 B1 | 1/2001 | Schmookler |

(Continued)

FOREIGN PATENT DOCUMENTS

| EP | 2887607 A1 | 6/2015 |
| EP | 2873186 B1 | 3/2018 |

(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.
(Continued)

*Primary Examiner* — Brandon Hoffman
(74) *Attorney, Agent, or Firm* — Carr & Ferrell LLP

(57) ABSTRACT

Systems and methods of secure analytics using an encrypted analytics matrix are disclosed herein. An example method includes encoding an analytic parameter set using a homomorphic encryption scheme as a homomorphic analytic matrix, wherein the homomorphic analytic matrix is generated by extracting a set of term components from an analytic and the analytic parameter set using a term generator function; transmitting a processing set to a server system, the processing set including at least the homomorphic analytic matrix and a keyed hashing function; and receiving a homomorphic encrypted result from the server system, the server system having utilized the homomorphic encryption scheme and the keyed hashing function to evaluate the homomorphic analytic matrix over a datasource.

25 Claims, 6 Drawing Sheets

Related U.S. Application Data

(60) Provisional application No. 62/462,818, filed on Feb. 23, 2017, provisional application No. 62/448,906, filed on Jan. 20, 2017, provisional application No. 62/448,896, filed on Jan. 20, 2017, provisional application No. 62/448,899, filed on Jan. 20, 2017, provisional application No. 62/448,916, filed on Jan. 20, 2017, provisional application No. 62/448,908, filed on Jan. 20, 2017, provisional application No. 62/448,883, filed on Jan. 20, 2017, provisional application No. 62/448,890, filed on Jan. 20, 2017, provisional application No. 62/448,893, filed on Jan. 20, 2017, provisional application No. 62/448,918, filed on Jan. 20, 2017, provisional application No. 62/448,902, filed on Jan. 20, 2017, provisional application No. 62/448,885, filed on Jan. 20, 2017, provisional application No. 62/448,913, filed on Jan. 20, 2017.

(51) Int. Cl.

| | | |
|---|---|---|
| *H04L 9/30* | (2006.01) | |
| *G06F 16/33* | (2019.01) | |
| *G06F 21/62* | (2013.01) | |
| *G06F 16/25* | (2019.01) | |
| *H04L 9/32* | (2006.01) | |
| *G06F 40/30* | (2020.01) | |
| *H04L 9/14* | (2006.01) | |
| *H04L 9/40* | (2022.01) | |
| *G09C 1/00* | (2006.01) | |
| *G06F 17/16* | (2006.01) | |
| *H04L 9/08* | (2006.01) | |
| *G06F 40/211* | (2020.01) | |
| *G06F 40/253* | (2020.01) | |
| *G06F 40/284* | (2020.01) | |
| *G06F 40/295* | (2020.01) | |
| *G06N 3/04* | (2006.01) | |
| *G06N 3/08* | (2006.01) | |
| *G06N 7/08* | (2006.01) | |
| *G06F 21/30* | (2013.01) | |

(52) U.S. Cl.
CPC .......... *G06F 17/16* (2013.01); *G06F 21/6218* (2013.01); *G06F 40/30* (2020.01); *G09C 1/00* (2013.01); *H04L 9/0643* (2013.01); *H04L 9/0861* (2013.01); *H04L 9/14* (2013.01); *H04L 9/30* (2013.01); *H04L 9/302* (2013.01); *H04L 9/3242* (2013.01); *H04L 63/0435* (2013.01); *G06F 21/30* (2013.01); *G06F 40/211* (2020.01); *G06F 40/253* (2020.01); *G06F 40/284* (2020.01); *G06F 40/295* (2020.01); *G06N 3/04* (2013.01); *G06N 3/08* (2013.01); *G06N 7/08* (2013.01); *H04L 2209/04* (2013.01); *H04L 2209/12* (2013.01)

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,849,185 B1 | 12/2010 | Rockwood |
| 7,870,398 B2 | 1/2011 | Perng et al. |
| 7,937,270 B2 | 5/2011 | Smaragdis et al. |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 | 4/2018 | Trepetin et al. |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 | 9/2018 | Arasu et al. |
| 10,075,288 B1 | 9/2018 | Khedr et al. |
| 10,120,893 B1 | 11/2018 | Rocamora et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 | 2/2019 | Antonopoulos et al. |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 10,771,237 B2 | 9/2020 | Williams et al. |
| 10,790,960 B2 | 9/2020 | Williams et al. |
| 10,817,262 B2 | 10/2020 | Carr et al. |
| 10,873,568 B2 | 12/2020 | Williams |
| 10,880,275 B2 | 12/2020 | Williams |
| 10,902,133 B2 | 1/2021 | Williams et al. |
| 10,903,976 B2 | 1/2021 | Williams et al. |
| 10,972,251 B2 | 4/2021 | Carr |
| 11,196,540 B2 | 12/2021 | Williams et al. |
| 11,196,541 B2 | 12/2021 | Williams et al. |
| 11,290,252 B2 | 3/2022 | Carr |
| 2002/0032712 A1 | 3/2002 | Miyasaka et al. |
| 2002/0073316 A1 | 6/2002 | Collins et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2003/0110388 A1 | 6/2003 | Pavlin et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 | 3/2007 | Smaragdis et al. |
| 2007/0095909 A1 | 5/2007 | Chaum |
| 2007/0140479 A1 | 6/2007 | Wang et al. |
| 2007/0143280 A1 | 6/2007 | Wang et al. |
| 2009/0037504 A1 | 2/2009 | Hussain |
| 2009/0083546 A1 | 3/2009 | Staddon et al. |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2009/0287837 A1 | 11/2009 | Felsher |
| 2010/0202606 A1 | 8/2010 | Almeida |
| 2010/0205430 A1 | 8/2010 | Chiou et al. |
| 2010/0241595 A1 | 9/2010 | Felsher |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |

(56) References Cited

U.S. PATENT DOCUMENTS

| | | |
|---|---|---|
| 2012/0039469 A1 | 2/2012 | Mueller et al. |
| 2012/0054485 A1 | 3/2012 | Tanaka et al. |
| 2012/0066510 A1 | 3/2012 | Weinman |
| 2012/0201378 A1 | 8/2012 | Nabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0114811 A1 | 5/2013 | Boufounos et al. |
| 2013/0148868 A1 | 6/2013 | Troncoso Pastoriza et al. |
| 2013/0170640 A1 | 7/2013 | Gentry |
| 2013/0191650 A1 | 7/2013 | Balakrishnan et al. |
| 2013/0195267 A1 | 8/2013 | Alessio et al. |
| 2013/0198526 A1 | 8/2013 | Goto |
| 2013/0216044 A1 | 8/2013 | Gentry et al. |
| 2013/0230168 A1 | 9/2013 | Takenouchi |
| 2013/0237242 A1 | 9/2013 | Oka et al. |
| 2013/0246813 A1 | 9/2013 | Mori et al. |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1* | 12/2013 | Kim .................. H04L 9/008 713/155 |
| 2013/0346755 A1 | 12/2013 | Nguyen et al. |
| 2014/0164758 A1 | 6/2014 | Ramamurthy et al. |
| 2014/0189811 A1 | 7/2014 | Taylor et al. |
| 2014/0233727 A1 | 8/2014 | Rohloff et al. |
| 2014/0281511 A1 | 9/2014 | Kaushik et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1 | 4/2016 | Soon-Shiong et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1* | 12/2016 | Gilad-Bachrach ... G06N 3/0481 |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2017/0366562 A1 | 12/2017 | Zhang et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0266282 A1 | 8/2019 | Mitchell et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0396053 A1 | 12/2020 | Williams et al. |
| 2021/0034765 A1 | 2/2021 | Williams et al. |
| 2021/0105256 A1 | 4/2021 | Williams |
| 2021/0409191 A1 | 12/2021 | Williams et al. |
| 2022/0006629 A1 | 1/2022 | Williams et al. |
| 2022/0116200 A1 | 4/2022 | Carr |

FOREIGN PATENT DOCUMENTS

| | | |
|---|---|---|
| JP | 5680007 B2 | 3/2015 |
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A Woods Hole Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Williams, Ellison Anne et al., "Wideskies: Scalable Private Information Retrieval," Jun. 8, 2016, 14 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

(56) References Cited

OTHER PUBLICATIONS

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "Gazelle: A Low Latency Framework for Secure Neural Network Inference", 27th USENIX Security Symposium, Aug. 15-17, 2018. pp. 1650-1668.

Bösch et al.,"SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

Bajpai et al., "A Fully Homomorphic Encryption Implementation on Cloud Computing," International Journal of Information & Computation Technology, ISSN 0974-2239 vol. 4, No. 8, 2014, pp. 811-816.

Viejo et al., "Asymmetric homomorphisms for secure aggregation in heterogeneous scenarios," Information Fusion 13, Elsevier B.V., Mar. 21, 2011, pp. 285-295.

Patil et al., "Big Data Privacy Using Fully Homomorphic Non-Deterministic Encryption," IEEE 7th International Advance Computing Conference, Jan. 5-7, 2017, 15 pages.

Panda et al., "FPGA Prototype of Low Latency BBS PRNG," IEEE International Symposium on Nanoelectronic and Information Systems, Dec. 2015, pp. 118-123, 7 pages.

Sahu et al., "Implementation of Modular Multiplication for RSA Algorithm," 2011 International Conference on Communication Systems and Network Technologies, 2011, pp. 112-114, 3 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

PIRK Code Excerpt—QuerierDriver, https://github.com/apache/incubator-retired-pirk/blob/master/src/main/java/org/apache/pirk/querier/wideskies/Querier.Driver.java; Jul. 11, 2016; 5 pages.

PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.

PIRK Code Excerpt—Query; [online]; Retreived from the Internet: <URL: https://github.com/apache/incubator-retired-pirk/blob/master/src/main/java/org/apache/pirk/query/wideskies/Query.java>; Jul. 11, 2016; 7 pages.

PIRK Code Excerpt—Queryinfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.

PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java>; Jul. 11, 2016; 8 pages.

PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.

PIRK Code Excerpt—HashSelectorsAndFormPartitionsBigInteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.

PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.

PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.

"PIRK Proposal" Apache.org [online], [retreived on Oct. 28, 2020]; Retreived from the Internet: <URL:https://cwiki.apache.org/confluence/display/incubator/PirkProposal>; Apr. 10, 2019; 5 pages.

Fan et al., "Somewhat Practical Fully Homomorphic Encryption", IACR Cryptol. ePrintArch. 2012, 19 pages.

"Microsoft Computer Dictionary", pp. 276 and 529, Microsoft Press, 5th Edition, ISBN 0735614954,2002, (Year: 2002), 4 pages.

"Homomorphic encryption", Wikipedia, May 22, 2021, pages.

\* cited by examiner

SECURE ANALYTICS USING AN ENCRYPTED ANALYTICS MATRIX

CROSS REFERENCE TO RELATED APPLICATIONS

This application is a continuation application of U.S. Nonprovisional patent application Ser. No. 15/876,036, filed Jan. 19, 2018, now granted U.S. Pat. No. 10,771,237 issued on Sep. 8, 2020, entitled "Secure Analytics Using an Encrypted Analytics Matrix," which claims the benefit and priority of U.S. Provisional Application Ser. No. 62/448,890, filed on Jan. 20, 2017; U.S. Provisional Application Ser. No. 62/448,918, filed on Jan. 20, 2017; U.S. Provisional Application Ser. No. 62/448,893, filed on Jan. 20, 2017; U.S. Provisional Application Ser. No. 62/448,906, filed on Jan. 20, 2017; U.S. Provisional Application Ser. No. 62/448,908, filed on Jan. 20, 2017; U.S. Provisional Application Ser. No. 62/448,913, filed on Jan. 20, 2017; U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; U.S. Provisional Application Ser. No. 62/448,902, filed on Jan. 20, 2017; U.S. Provisional Application Ser. No. 62/448,896, filed on Jan. 20, 2017; U.S. Provisional Application Ser. No. 62/448,899, filed on Jan. 20, 2017; and U.S. Provisional Application Ser. No. 62/462,818, filed on Feb. 23, 2017, all of which are hereby incorporated by reference herein, including all references and appendices, for all purposes.

FIELD OF INVENTION

The present disclosure is directed to the technical field of encryption and decryption methods and apparatus as applied to computing systems. More particularly, the present disclosure is in the technical field of homomorphic encryption methods and apparatuses.

SUMMARY

According to some embodiments, the present disclosure is directed to a method comprising: encoding an analytic parameter set using a homomorphic encryption scheme as a homomorphic analytic matrix; transmitting a processing set to a server system, the processing set comprising at least the homomorphic analytic matrix and a keyed hashing function; and receiving a homomorphic encrypted result from the server system, the server system having utilized the homomorphic encryption scheme and the keyed hashing function to evaluate the homomorphic analytic matrix over a datasource.

According to some embodiments, the present disclosure is directed to a method comprising: receiving a homomorphic analytic matrix that comprises an analytic and analytic parameter set encoded by a client system using a homomorphic encryption scheme; utilizing at least the homomorphic encryption scheme and a keyed hashing function to evaluate the homomorphic analytic matrix over a datasource and generate an encrypted result; and transmitting the encrypted result to the client system.

According to some embodiments, the present disclosure is directed to a system comprising: a client system configured to: encode an analytic parameter set using a homomorphic encryption scheme as a homomorphic analytic matrix; transmit a processing set to a server system, the processing set comprising at least the homomorphic analytic matrix and a keyed hashing function; and receive a homomorphic encrypted result; and a server system that communicatively couples with the client system and a data repository, the server system being configured to: receive the processing set from the client system; utilize at least the homomorphic encryption scheme and a keyed hashing function to evaluate the homomorphic analytic matrix over a datasource and generate an encrypted result; and transmit the encrypted result to the client system.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Generally speaking, the present disclosure includes systems and methods that perform secure analytics processing using an encrypted analytics matrix. In some embodiments, an analytic and analytic parameter set is encrypted using a homomorphic encryption scheme.

In some embodiments, these system and methods are configured to perform end-to-end secure analytics using homomorphic encryption. These systems and methods encrypt an analytic (and its corresponding analytic parameter set) using homomorphic encryption techniques into an encrypted analytic, perform the encrypted analytic over the desired datasource(s), produce encrypted results, return those encrypted results to the user. The user can then decrypt the results using homomorphic encryption techniques (e.g., applying a key used to homomorphically encrypt the analytic and parameter set).

Using these systems and methods a user can perform any desired analytic over one or more datasources in a completely secure and private manner. In more detail the systems and methods disclosed herein never reveal the contents or results of an analytic to a data owner, an observer, an attacker, or any other entity, even those entities having a view onto or into the end-to-end process.

Figure 1:
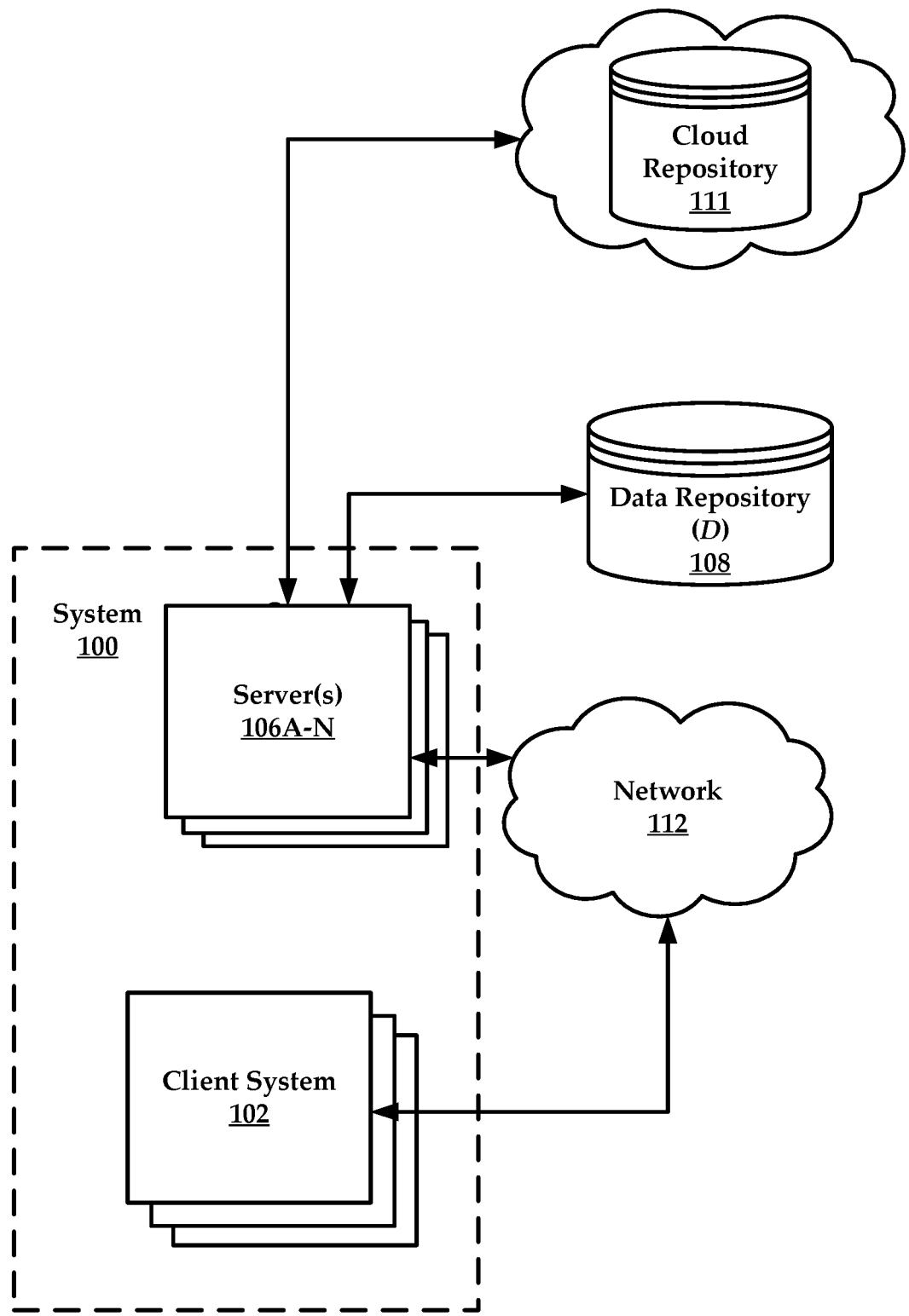
FIG. 1 is a schematic diagram of an example system that is used to practice the various methods disclosed herein.

FIG. 1 illustrates an example system 100 that is constructed in accordance with the present disclosure. The system 100 enables the creation and processing of homomorphically encrypted analytic parameter sets (e.g., homomorphic analytics matrices) in order to create an encrypted result that can be decrypted by a user.

In general, the system 100 comprises a client system 102, server(s) 106A-N (could be a single server), and a data repository 110. In some embodiments, the components of the system 100 can communicate over one or more public or private networks, such as network 112. Note that there may be multiple servers corresponding to a single client system 102 in some embodiments. The server(s) 106A-N and the client system 102 may reside in varied computing environments to include a shared computing architectures, hybrid architectures, or distinct architectures such as those in a cloud computing environments.

In some embodiments, a single server can provide end-to-end secure analytics in cooperation with a plurality of client systems. In additional embodiments, a plurality of servers can provide end-to-end secure analytics in cooperation with a plurality of client systems. Thus, embodiments disclosed herein can include one-to-many relationships between client systems and servers and many-to-many relationships as well.

It will be understood that the combination of the client system(s) and server(s) is generally referred to as a system for end-to-end secure analytics using homomorphic encryption.

In general, a target datasource, such as the data repository 108 is referred to as D. An analytic A is to be executed over the data repository 108 (e.g., a data structure stored in the data repository, such as an array or database) using an analytic parameter set {A_P}.

Just as there can be multiple servers, the data repository 108 may reside on a single server or may be distributed over multiple servers. The datasource on the data repository 108 may be unencrypted (in plaintext form), deterministically encrypted (such as Rivest-Shamir-Adleman (RSA) or some block ciphering algorithms), semantically encrypted (such as Advanced Encryption Standard (AES), probabilistically encrypted, or any combination thereof. The data repository 108 can include a distributed data repository where data is stored in a plurality of distinct locations, which could include different blades in a server system, containers in a cloud, or servers that are geographically remote from one another, just as examples. Thus, the datasource could be partly stored on the data repository 108, partly on a cloud repository 111, or the datasource could be wholly stored on either.

According to some embodiments, using a homomorphic encryption scheme E, such as Paillier encryption, the analytic A and analytic parameter set {A_P} are encoded as a homomorphic analytic matrix {A_M}. To be sure, the homomorphic analytic matrix {A_M} is completely encrypted. Thus, the analytic A and/or the analytic parameter set {A_P} cannot be recovered from {A_M} without a private key E, $K_{\{A\_M, E\}}$ used to homomorphically encrypt the analytic parameter set {A_P} with the private key E, $K_{\{A\_M, E\}}$. This construct allows the system to fulfill a homomorphic analytic request, providing a secure and completely encrypted method of performing the analytic request in contrast with traditional methods (e.g., non-homomorphic) of performing analytics over the datasource(s) 108 on data repository (and/or cloud repository 111).

In some embodiments, the homomorphic encryption scheme E and private key E, $K_{\{Q\_V, E\}}$ form a paired data set. The client system 102 retains the private key for later use. The paired data set can also be retained at the client system 102.

While Paillier encryption has been noted as an example homomorphic encryption scheme, one of ordinary skill in the art will appreciate that other homomorphic encryption schemes can likewise be utilized in accordance with the present disclosure. These homomorphic encryption schemes include, but are not limited to, fully and/or partially homomorphic encryption schemes. Indeed, any encryption scheme, protocol, or format that allows for computation of an encrypted data set without requiring decryption of the encrypted data set during computation can be used.

In order to perform the secure end-to-end analytics processing of the present disclosure, the homomorphic analytic matrix {A_M} is first constructed from the analytic A and the analytic parameter set {A_P} and encoded using the homomorphic encryption scheme E. In some embodiments, the homomorphic encryption scheme E can be applied to the analytic parameter set {A_P}. In other embodiments, the homomorphic encryption scheme E can be applied at a later point in the method, such as after an analytic matrix is assembled.

A set of term components {T} of the analytic A are extracted using a term generation function TG. For example, if the analytic A is a database frequency distribution analytic for elements in <row:column> pairs, then the set of term components {T} reflects the frequency distribution of these elements from the datasource on the data repository 108. To be sure, the specifics of the analytic A, the analytic parameter set {A_P}, the set of term components {T}, and the term generation function TG will vary according to each particular analytic analysis that is performed.

For context, the term generation function TG is applied to the analytic A to produce the set of term components {T} that determine what data is obtained from the data repository 108 in response to the specifics of the analytic A. The term generator function TG can include any set of rules or parameters that are used to convert the analytic A into a format that can be used by the server(s) 106A-N to fulfill the analytic A (analytic A and analytic parameter set {A_P}) over the data repository 108.

After the set of term components {T} are generated, a keyed hashing function H is then applied to the set of term components {T}. Thus, H is a keyed hashing function generated with a key k. In some embodiments a range of the keyed hashing function H is obtained over the set of term components s{T} such that H(T)={H(T): T in {T}}.

In some embodiments, a desired dimension of the homomorphic analytic matrix A_M is represented as d×s where s>|{T}|, s>=d, and d∥H(T))|. The keyed hashing function H (such as keyed-hash message authentication code (HMAC)) can be used to create cryptographic checksums in some embodiments that allow for both data verification and data authentication. In some embodiments, the hash function H is used to process the set of term components {T} to remove zero value bitmasks, which would, if processed over the data repository 108, return no usable data.

In some embodiments, this bitwise analysis is performed over C(H(T))={c_T: c_T is the d-dimensional homomorphic analytic matrix partitioning the hash H(T) into d-many bitwise components}, |C(H(T))|=|H(T))|=|{T}|.

In one non-limiting example, if d=3 and H(T)=000001001111, then c_T={c_T [0], c_T[1], c_T[2]} where c_T [0]=0000, c_T[1]=0100, and c_T[2]=1111. To be sure, the bitwise hash created from the set of terms {T} is divided into three sets of four bits. In some embodiments, c_T[d−1] must be distinct for all elements in H(T). If this is not the case, a different keyed hash function H' can be selected to avoid bitwise component collisions (e.g., where two or more bitwise components have identical hashed values). This different keyed hash function H' can be used to reconstruct H(T) and C(H(T)) before proceeding.

Zero and non-zero bitmasks are identified in some embodiments such that for j=0, . . . , (d−1): for m=0, . . . , (s−1): if there exists an element of C(H(T)) such that c_T[j]=m, then let A_M (j,m)=E(B_j,m) where B_j,m is a nonzero bit mask corresponding to an element of {T}; otherwise, A_M (j,m)=E(0). In this manner, the homomorphic analytic matrix A_M contains only encryptions of nonzero bitmasks for the set of term components {T}. Thus, zero value bitmasks are not evaluated in some embodiments. To be sure, the set of term components {T} that produce zero value bitmasks are disregarded by the server system 106A-N, which reduces computing time.

In sum, once the term generation function TG has been applied to the analytic A to generate the set of term components {T}, the hashing function K is applied to the set of term components {T} to determine nonzero value bitmasks for at least a portion of the set of term components {T}, in order to assemble the homomorphic analytic matrix A_M.

In some embodiments, a processing set or message can be generated and transmitted from the client system 102 to the server(s) 106A-N. This processing set includes the homomorphic analytic matrix A_M, the term generator function TG, the analytic A, and the keyed hash function H.

A processing set is then executed by the server(s) 106A-N over the target datasource (e.g., data repository 108). In more detail, using techniques of the homomorphic encryption scheme E and the keyed hash function H, the server(s) 106A-N extract the set of term components {T} from the data repository 108 using the term generator function TG. The server(s) 106A-N then evaluate the homomorphic analytic matrix A_M over the set of term components {T} to produce the encrypted result E(R).

Next, the server(s) 106A-N sends the encrypted results E(R) back to the client system 102. Using the private key associated with {A_M}, $K_{\{A\_M, H\}}$, the client system 102 decrypts the encrypted result E(R) to obtain the result R of the analytic A.

As the homomorphic analytic matrix {A_M} only contains non-zero entries for the set of term components {T}, the homomorphic properties of E ensure that only encrypted results corresponding to the nonzero elements of the analytic and analytic parameter set are present in the results R. Again, this nonzero bitmasking identification and removal process is a function of the hashing function H that was applied to the set of term components {T} extracted from the analytic A by use of the term generator TG.

Thus, the analytic A was performed over the datasource in the data repository 108 in a completely secure and private manner. Indeed, the contents of the analytic A (as well as the analytic parameter set {A_P}), the contents of the homomorphic analytic matrix {A_M}, and/or the results R of the analytic A are never revealed to the data owner, an observer, an attacker, or any other third party.

Figure 2:
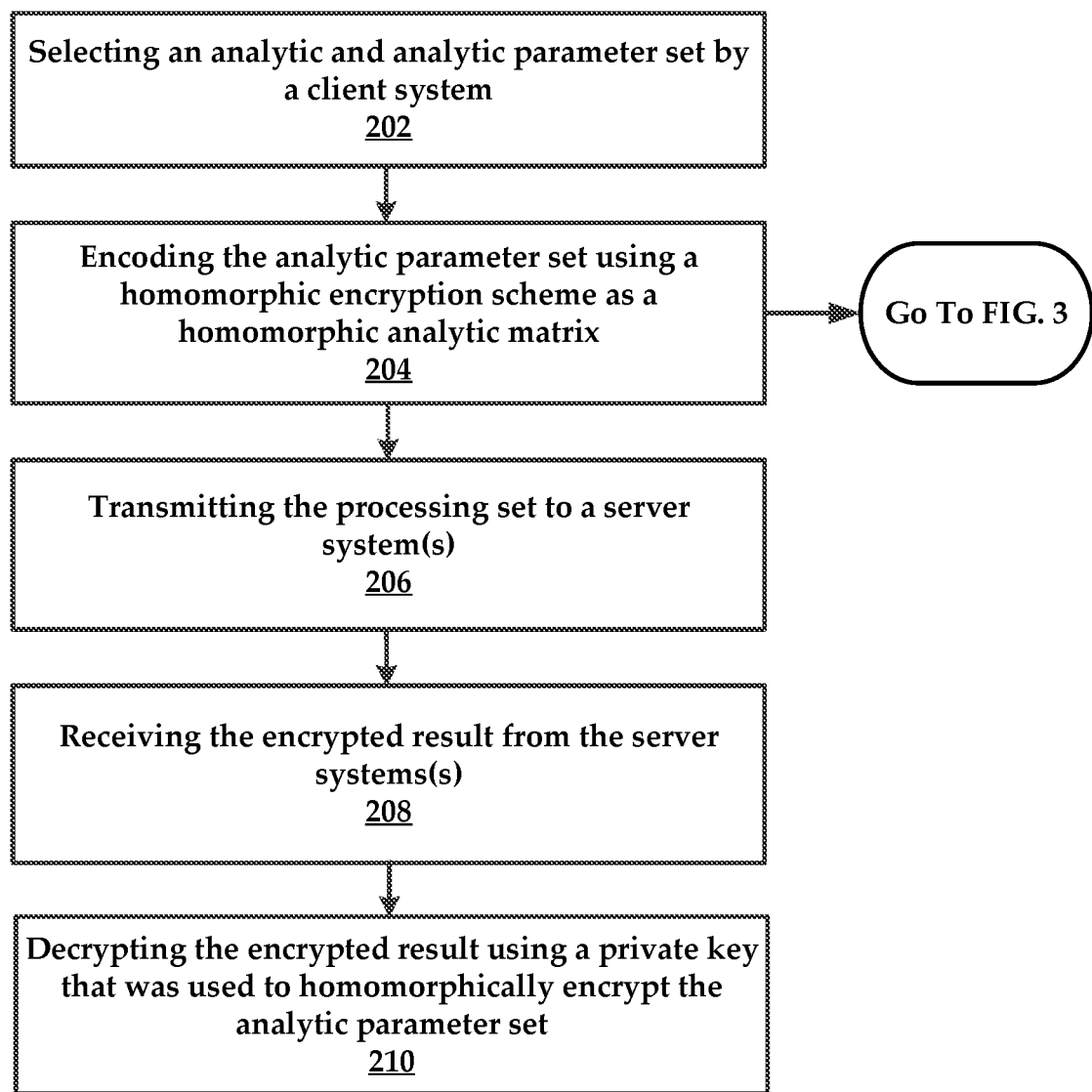
FIG. 2 is a flowchart of an example method executed by a client system.

FIG. 2 is a flowchart of an example method performed by a client system that is constructed and programmed in accordance with the present disclosure. In general, the process is initiated when a client system desires to process an analytic and an analytic parameter set. Specifically, the analytic parameter set is converted into a homomorphic analytic matrix in some embodiments.

By way of non-limiting example, the client system selects an analytic and corresponding analytic parameter set. In one embodiment, the analytic could include determining a range of Internet Protocol (IP) addresses matched to user identifiers. These IP addresses are associated with users who have not logged onto a particular service for a period of time. For example, an address 123.2.1.2 is linked to a user identifier of a@abc.co. This user has not logged onto an email service for a month or more.

These data pairs can be stored in a relational database (e.g., datasource) in a data repository. In some embodiments, these data pairs are stored in different columns or fields of a database. The analytic and analytic parameter set {A_P}, when processed over the database will produce a set of IP addresses and user identifiers that correspond to this desired analytic.

To be sure, this example is provided merely for describing example use cases of the present disclosure and is limited in nature for purposes of clarity and brevity of description. Indeed, other use cases can be more complex, such as when the analytic parameter set requires a plurality of parameters in order to complete the analytic. In addition, multiple analytics can be performed sequentially or in parallel.

In some embodiments, the method includes a step 202 of selecting (or receiving a selection from a user) an analytic and analytic parameter set by a client system. Again, the analytic comprises the analytic parameter set that is to be executed over the datasource. A user can select their desire analytic and analytic parameter set through GUIs generated by a user-facing application.

Next, the method includes a step 204 of encoding the analytic parameter set using a homomorphic encryption scheme as a homomorphic analytic matrix. A specific example sub-method of encoding the analytic parameter set using a homomorphic encryption scheme as a homomorphic analytic matrix is illustrated in FIG. 3.

Figure 3:
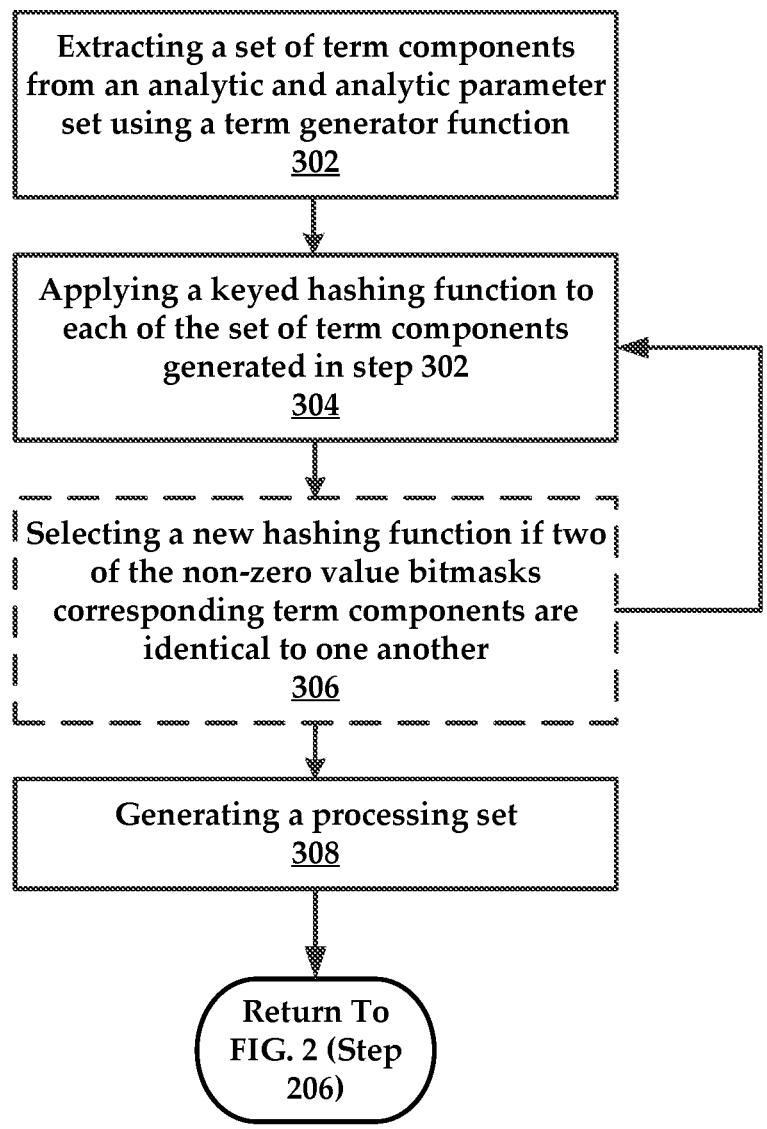
FIG. 3 is a flowchart of a sub-method for constructing a homomorphic analytic matrix.

Referring briefly to FIG. 3, the sub-method of encoding the analytic parameter set using a homomorphic encryption scheme can comprise a step 302 of extracting a set of term components from an analytic and analytic parameter set using a term generator function. As noted above, if the analytic is a database frequency distribution analytic for elements in <row:column> pairs, then the set of term components reflects a frequency distribution of these elements from a datasource.

In some embodiments, the method can include a step 304 of applying a keyed hashing function to each of the set of term components generated in step 302. A hashing key used to hash the set of term components can be retained by the client system. This hashing operation will produce non-zero value bitmasks, and in some instances zero value bitmasks as well. Rather than processing term components corresponding to zero value bitmasks, the method can include ignoring zero value bitmasks. As noted above, this bitwise analysis performed over each of the set of term components.

The method can also include a step 306 of selecting a new hashing function if two of the non-zero value bitmasks corresponding term components are identical to one another. Again, this prevents collisions or confusion in the analytic results for these non-zero value bitmasks. Thus, the method would return to step 302 in some embodiments and step 306 is optional and illustrated in dotted line.

Once the non-zero bitmasks of term components are identified, the method includes a step 308 of generating a processing set. The processing set includes the homomorphic analytic matrix, the term generator function, the analytic, and the keyed hash function.

Returning back to FIG. 2, the method further includes a step 206 of transmitting the processing set to a server system(s).

The server system(s) will utilize the homomorphic analytic matrix, the term generator function, the analytic, and the keyed hash function. In more detail, the server system(s)

will extract a set of term components from the datasource using a term generator function. This includes utilization of both the homomorphic encryption scheme and the keyed hashing function disclosed above.

The server system(s) will then evaluate the homomorphic analytic matrix over the datasource using the extracted set of term components to generate an encrypted result. To be sure, this encrypted result is a homomorphically encrypted result corresponding to the homomorphic analytic matrix.

In accordance with the present disclosure, the method can also include a step 208 of receiving the encrypted result (e.g., response to the analytic). In one or more embodiments, the method includes a step 210 of decrypting the encrypted result using a private key that was used to homomorphically encrypt the analytic parameter set. This allows the client system to review the results. Again, this process in FIG. 2 was performed in a secure end-to-end (e.g., between client(s) and server(s)) process using the techniques of homomorphic encryption.

Figure 4:
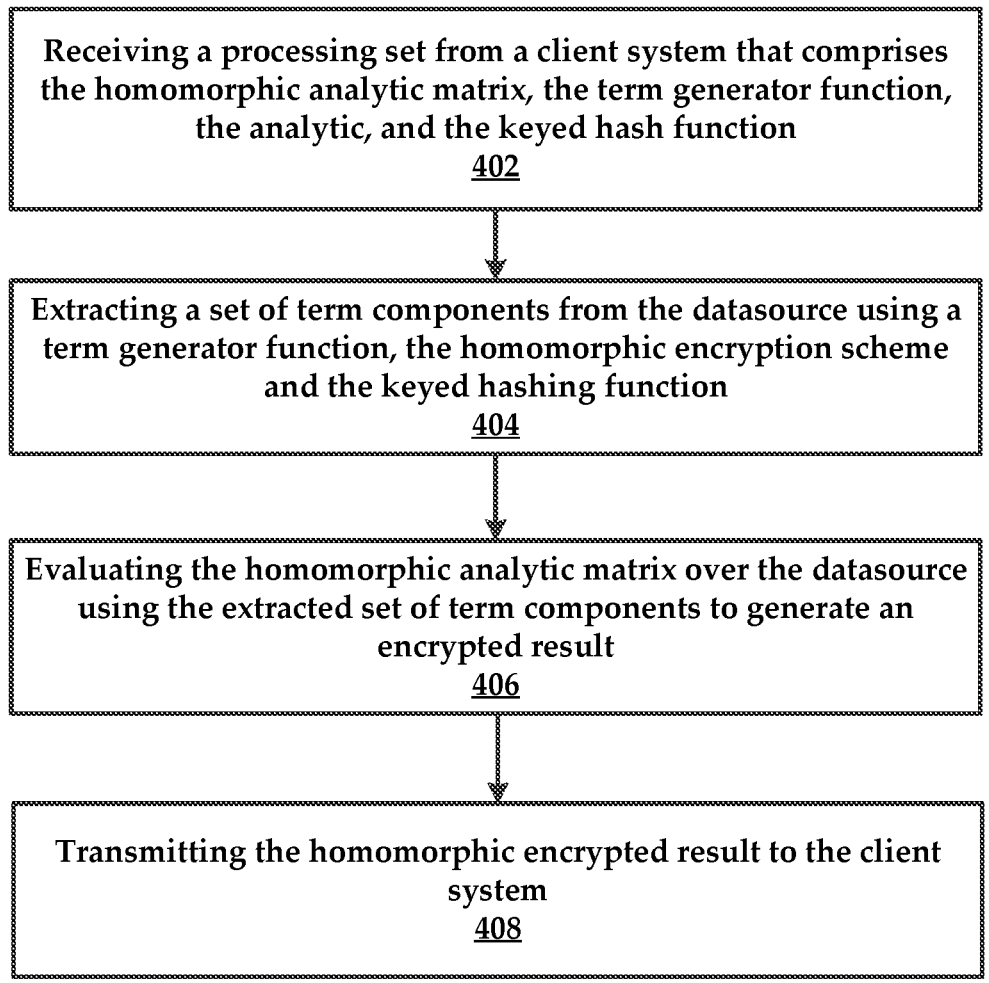
FIG. 4 is a flowchart of an example method executed by one or more server(s).

FIG. 4 is a flowchart of an example method performed by server(s) constructed and programmed in accordance with the present disclosure. In general, the process is initiated when a server system receives a homomorphic analytic matrix from a client system. The method for generating the homomorphic analytic matrix is illustrated and described with respect to the embodiments of FIG. 2 and otherwise throughout this disclosure.

In some embodiments, the method includes a step 402 of receiving a processing set from a client system that comprises the homomorphic analytic matrix, the term generator function, the analytic, and the keyed hash function. The homomorphic analytic matrix is an encoded analytic matrix generated by a client system using a homomorphic encryption scheme.

According to some embodiments, the method also includes a step 404 of extracting a set of term components from the datasource using a term generator function. This includes utilization of both the homomorphic encryption scheme and the keyed hashing function disclosed above.

The method then includes a step 406 of evaluating the homomorphic analytic matrix over the datasource using the extracted set of term components to generate an encrypted result. To be sure, this encrypted result is a homomorphically encrypted result corresponding to the homomorphic analytic matrix.

Next, the method includes a step 408 of transmitting the homomorphic encrypted result to the client system. As noted above, the client system would then be able to decrypt the homomorphically encrypted result and recover the result of the analytic(s).

Figure 5:
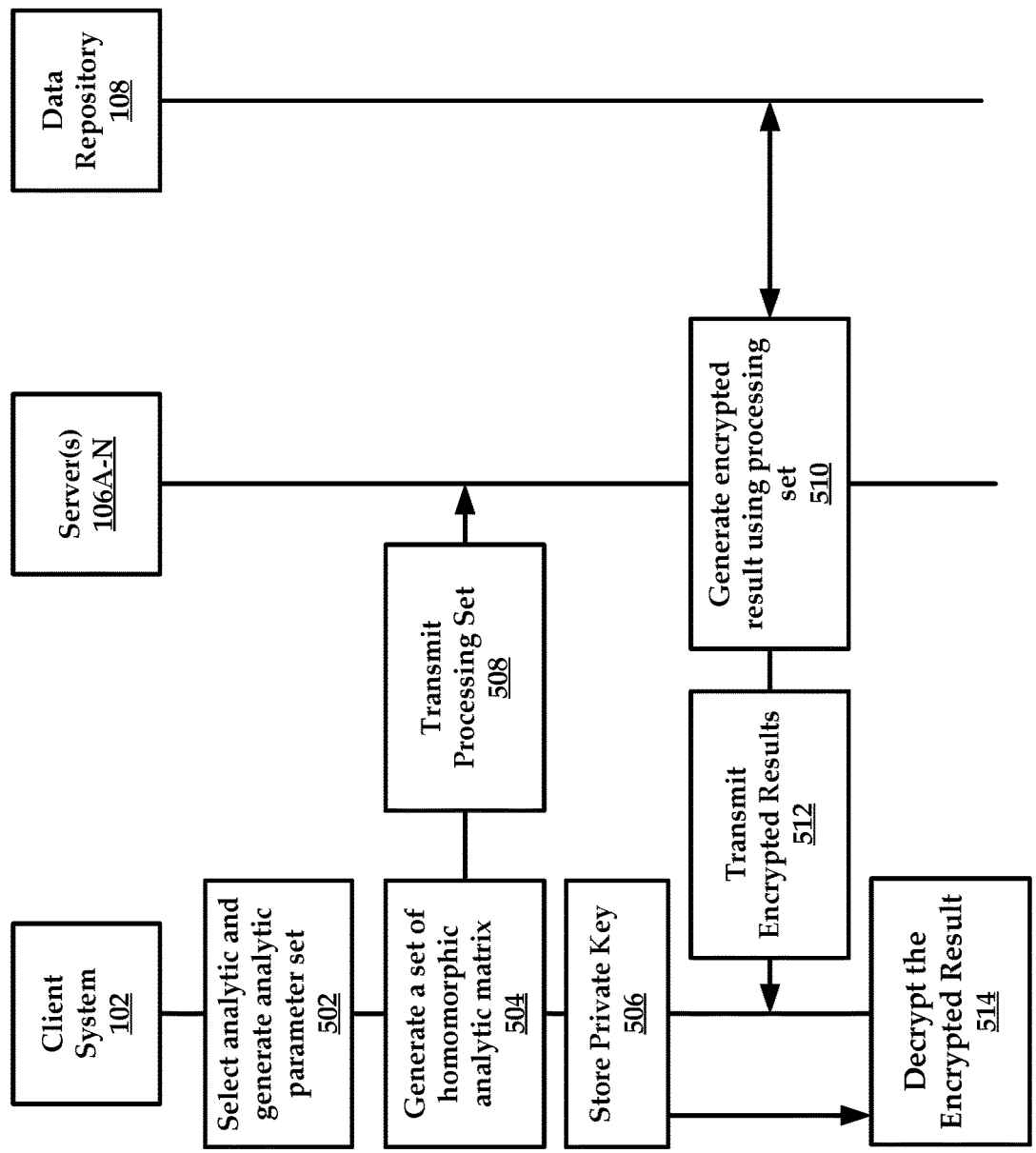
FIG. 5 is a signal flow diagram illustrating cooperative behavior between both a client system and one or more server(s) when performing a method of homomorphic analytic processing as disclosed herein.

FIG. 5 is a signal flow diagram of an example end-to-end secure analytic processing method using a homomorphic analytic matrix. This process illustrates an end-to-end process executed between a client system and server(s) of the present disclosure.

In some embodiments, the client system 102 performs a set of operations such as a process of selecting or specifying an analytic. In this instance, an analytic is selected that includes an analytic parameter set in process 502. The client system 102 then utilizes a homomorphic encryption scheme to generate a homomorphic analytic matrix in process 504. A private key 506 used to homomorphically encrypt the analytic parameter set is retained on the client system 102.

As noted above in the method of FIG. 3, the process of generating the homomorphic analytic matrix comprises, in some embodiments, steps that include extracting term components from an analytic and hashing the set of term components using a hashing function. In some embodiments, the process illustrated in FIG. 5 also comprises generating a processing set that comprises the homomorphic analytic matrix, the term generator function, the analytic, and the keyed hash function.

The processing set is transmitted to server(s) 106A-N in a transmission process 508. The server(s) 106A-N then evaluates the homomorphic analytic matrix over the datasource (e.g., data repository 108) using the extracted set of term components to generate an encrypted result in process 510. This process generates an encrypted result. The server(s) 106A-N then transmit the encrypted result back to the client system 102 in transmission process 512. The client system 102 can then decrypt the encrypted result to recover the result in process 514.

Figure 6:
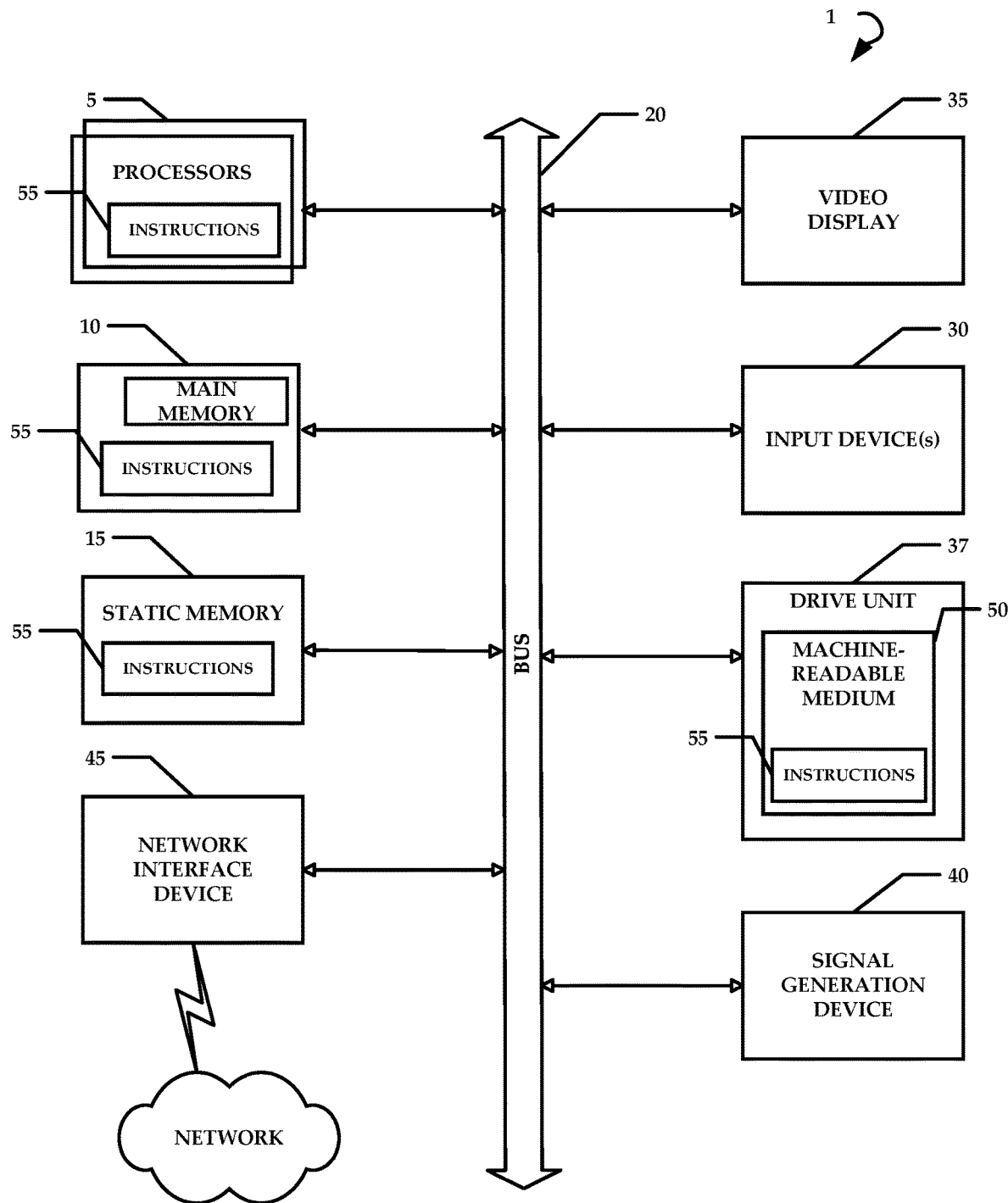
FIG. 6 illustrates an exemplary computing system that may be used to implement embodiments according to the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
   encoding an analytic parameter set using a homomorphic encryption scheme as a homomorphic analytic matrix, wherein the homomorphic analytic matrix is generated by extracting a set of term components from an analytic and the analytic parameter set using a term generator function;
   transmitting a processing set to a server system, the processing set comprising at least the homomorphic analytic matrix and a keyed hashing function; and
   receiving a homomorphic encrypted result from the server system, the server system having utilized the homomorphic encryption scheme and the keyed hashing function to evaluate the homomorphic analytic matrix over a datasource.

2. The method according to claim 1, wherein the term generator function includes at least one of a plurality of rules and a plurality of parameters, to convert the analytic into a format that can be used by the server system.

3. The method according to claim 1, further comprising decrypting the homomorphic encrypted result using a private key that was used to homomorphically encrypt the analytic parameter set into the homomorphic analytic matrix.

4. The method according to claim 1, wherein the homomorphic analytic matrix is generated further by:
   applying the keyed hashing function to each of the set of term components to generate bitmask values; and
   identifying a portion of the set of term components having a zero bitmask value.

5. The method according to claim 4, further comprising ignoring the portion of the set of term components having a zero bitmask value such that the homomorphic analytic matrix includes non-zero bitmask value ones of the set of term components.

6. The method according to claim 5, further comprising selecting a new hashing function if two non-zero bitmask values corresponding term components are identical to one another.

7. The method according to claim 5, further comprising generating the processing set, the processing set comprising the homomorphic analytic matrix, the term generator function, the analytic, and the keyed hashing function.

8. The method according to claim 6, wherein the homomorphic analytic matrix, the term generator function, the analytic, the keyed hashing function, and the encrypted result are never revealed to a data owner, an observer, or an attacker.

9. The method according to claim 1, wherein the datasource may reside on a single server or may be distributed over multiple servers or in a cloud.

10. The method according to claim 9, wherein the datasource comprises unencrypted plaintext, deterministically encrypted ciphertext, semantically encrypted ciphertext, probabilistically encrypted ciphertext, and any combination thereof.

11. A method, comprising:
   receiving a homomorphic analytic matrix that comprises an analytic and an analytic parameter set encoded by a client system using a homomorphic encryption scheme, the homomorphic analytic matrix having been generated by extracting a set of term components from the analytic and the analytic parameter set using a term generator function;

utilizing at least the homomorphic encryption scheme and a keyed hashing function to evaluate the homomorphic analytic matrix over a datasource and generate an encrypted result; and transmitting the encrypted result to the client system.

12. The method according to claim 11, wherein the datasource may reside on a single server or may be distributed over multiple servers.

13. The method according to claim 11, further comprising:

evaluating the homomorphic analytic matrix over the datasource using the extracted set of term components to generate the encrypted result.

14. A system comprising:

a client system configured to:
encode an analytic parameter set using a homomorphic encryption scheme as a homomorphic analytic matrix wherein the homomorphic analytic matrix is generated by extracting a set of term components from an analytic and the analytic parameter set using a term generator function;
transmit a processing set to a server system, the processing set comprising at least the homomorphic analytic matrix and a keyed hashing function; and
receive a homomorphic encrypted result; and a server system that communicatively couples with the client system and a data repository, the server system being configured to:
receive the processing set from the client system;
utilize at least the homomorphic encryption scheme and the keyed hashing function to evaluate the homomorphic analytic matrix over a datasource and generate an encrypted result; and
transmit the encrypted result to the client system.

15. The system according to claim 14, wherein the client system is further configured to decrypt the encrypted result using a private key that was used to homomorphically encrypt the analytic parameter set.

16. The system according to claim 15, wherein the homomorphic analytic matrix, the term generator function, the analytic, the keyed hashing function, and the encrypted result are never revealed to a data owner, an observer, or an attacker.

17. The system according to claim 16, wherein the datasource may reside on a single server or may be distributed over multiple servers.

18. The system according to claim 17, wherein the datasource comprises unencrypted plaintext, deterministically encrypted ciphertext, semantically encrypted ciphertext, probabilistically encrypted ciphertext, and any combination thereof.

19. The system according to claim 14, wherein the client system is further configured to generate the homomorphic analytic matrix by:
applying the keyed hashing function to each of the set of term components to generate bitmask values; and
identifying a portion of the set of term components having a zero bitmask value.

20. The system according to claim 14, wherein the server system is further configured to evaluate the homomorphic analytic matrix over the datasource using the extracted set of term components to generate the encrypted result.

21. The system according to claim 14, wherein the term generator function includes at least one of a plurality of rules and a plurality of parameters, to convert the analytic into a format that can be used by the server system.

22. A system for securely searching data in a semi-trusted environment, the system comprising:

a first data provider comprising one or more first processors configured to:
map a first data element comprising secret data to a first plurality of terms using a codebook of terms, generated by one or more term generators, to represent data elements;
concatenate the first plurality of terms to generate a first term signature comprising the first plurality of terms that uniquely represents the first data element; and
homomorphically encrypt the first term signature using a public homomorphic encryption key to generate a homomorphically encrypted first term signature representing the first data element;

a second data provider comprising one or more second processors configured to:
map a second data element to a second plurality of terms using the codebook of terms, generated by one or more term generators, wherein one of the first and second data elements is a search query and the other is target data being searched;
concatenate the second plurality of terms to generate a second term signature comprising the second plurality of terms that uniquely represent the second data element; and
compare the homomorphically encrypted first term signature representing the first data element and an unencrypted or homomorphically encrypted second term signature to generate a homomorphically encrypted comparison of the first and second term signatures; and a trusted party comprising one or more processors configured to:
decrypt the homomorphically encrypted comparison, using a private homomorphic decryption key, to determine if the first and second term signatures match or not respectively indicating that the search query is found or not in the target data.

23. The system of claim 22, wherein the codebook of terms is dynamically updated by adding new terms to the codebook and deleting preexisting terms from the codebook, wherein the updated codebook is simultaneously available to both the first and second data providers.

24. The system of claim 22, wherein the comparison of the first and second term signatures is a binary indication of whether or not the search query is found in the target data.

25. The system of claim 22, wherein the comparison of the first and second term signatures is a matching score indicating a frequency or certainty with which the search query is found in the target data.

* * * * *